W. E. KLEIN.
AUTOMOBILE HEADLIGHT.
APPLICATION FILED MAR. 29, 1917.
1,249,421.
Patented Dec. 11, 1917.
2 SHEETS—SHEET 1.
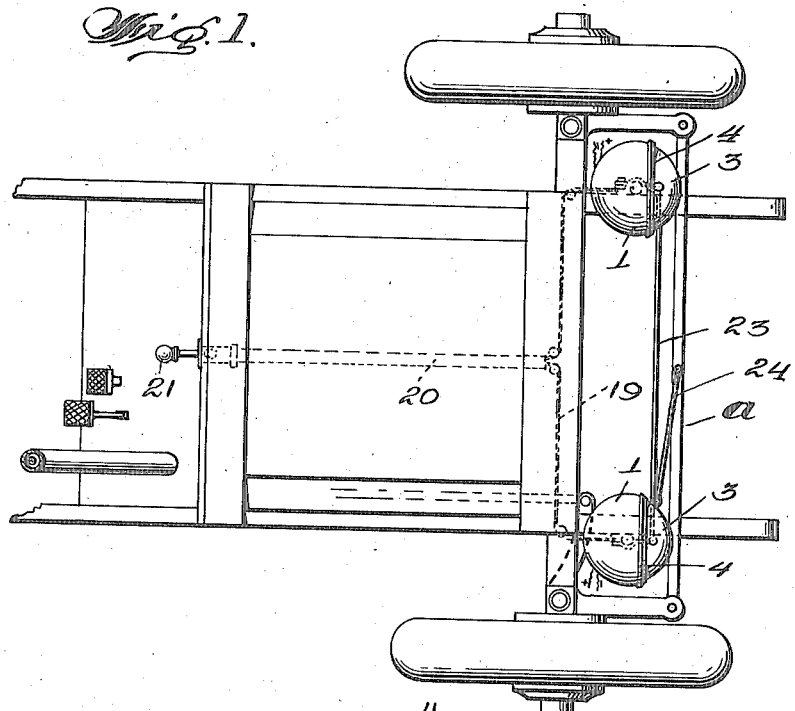
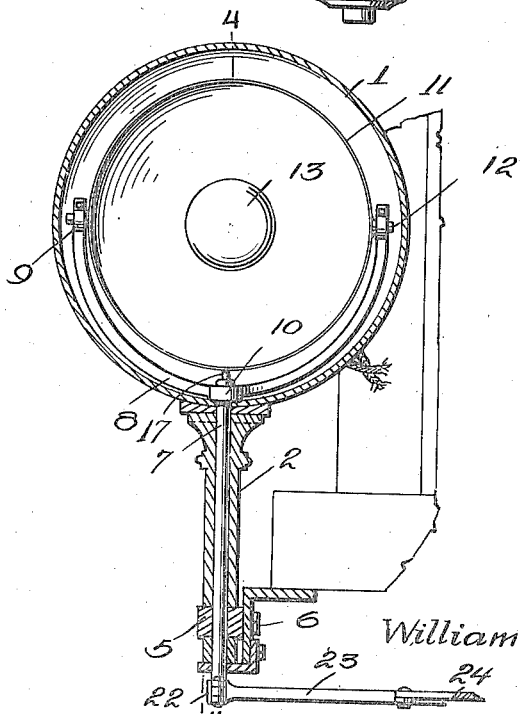
Inventor
William E. Klein

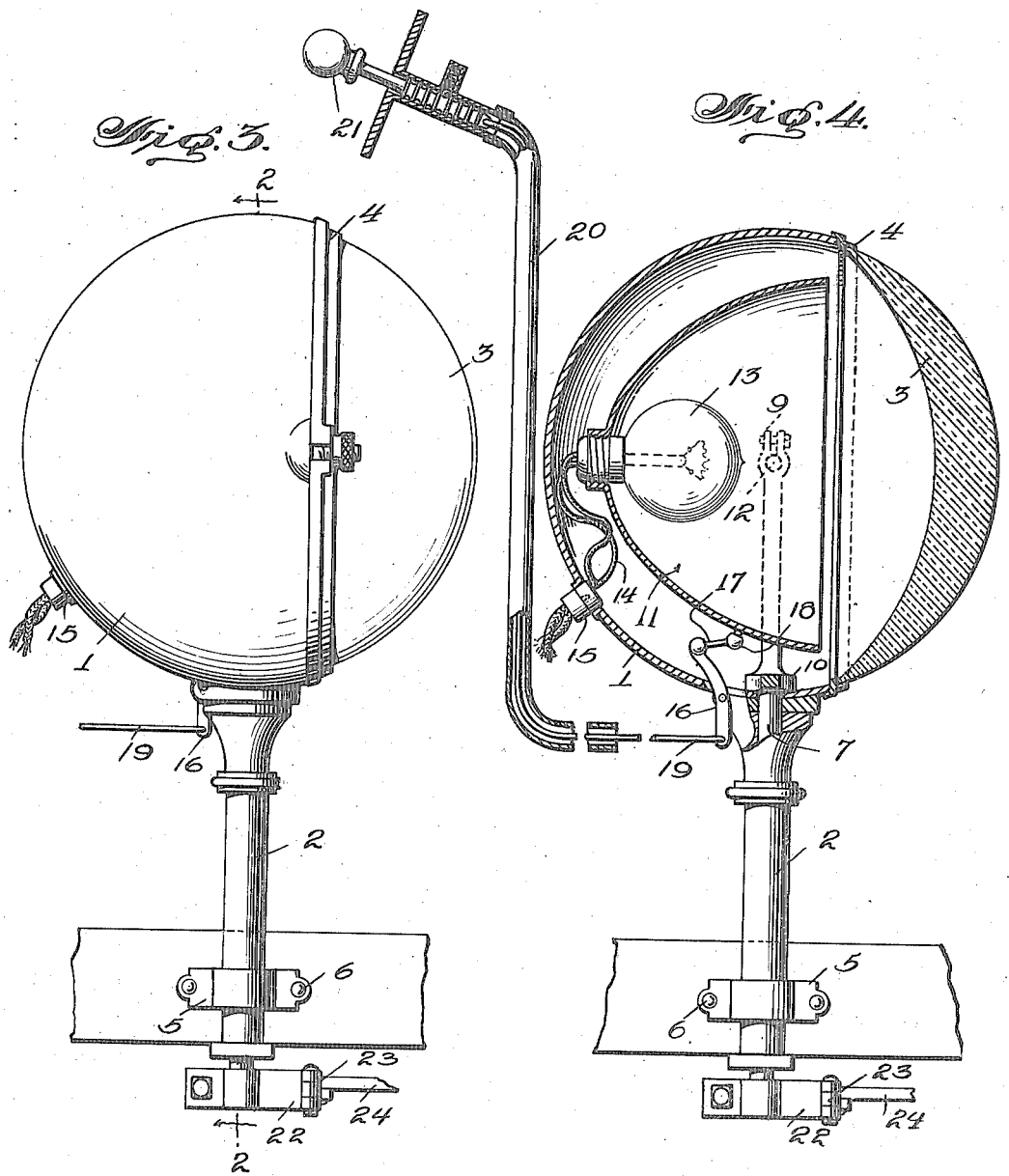

UNITED STATES PATENT OFFICE.

WILLIAM E. KLEIN, OF TAPPAN, NEW YORK.

AUTOMOBILE-HEADLIGHT.

1,249,421.  Specification of Letters Patent.  Patented Dec. 11, 1917.

Application filed March 29, 1917. Serial No. 158,265.

*To all whom it may concern:*

Be it known that I, WILLIAM E. KLEIN, a citizen of the United States, residing at Tappan, in the county of Rockland and State of New York, have invented certain new and useful Improvements in Automobile-Headlights; and I do declare the following to be a full, clear, and exact description of the invention, such as will enable others skilled in the art to which it appertains to make and use the same.

This invention relates to certain new and useful improvements in dirigible headlights for automobiles and other vehicles.

One object of the invention is to provide a headlight which is operatively connected with the steering mechanism of an automobile so that when the latter is making a turn, the headlight will be also turned, and thereby at all times project its light in the direction of travel of the automobile.

Another object of the invention is to provide a headlight which is provided with means whereby it may be operated from the steering wheel of the automobile to shift its light up or down.

A further object of the invention is to generally improve upon the construction of headlights of this character by the provision of a comparatively simple, strong, durable and inexpensive construction and one which will be efficient and reliable in operation, and well adapted to the purpose for which it is designed.

With these and numerous other objects in view, the invention consists of certain novel features of construction, and the combination and arrangement of parts as will be hereinafter fully described and claimed.

In the accompanying drawings forming a part of the application and in which similar reference characters are used to designate like parts throughout the several views:

Figure 1 is a top plan view of the fore part of an automobile, showing a pair of headlights constructed in accordance with this invention attached thereto and operatively connected with the steering mechanism thereof;

Fig. 2 is a vertical section of one of the headlights, taken on the line 2—2 of Fig. 3;

Fig. 3 is a side elevation of the same; and,

Fig. 4 is a central vertical sectional view of the headlight taken on the plane indicated by the line 4—4 of Fig. 2.

Referring more particularly to the drawings, the reference numeral 1 designates a shell constructed preferably of metal, and having an upright hollow supporting standard or bracket 2 depending from the lower side thereof. This shell 1 is substantially semispherical in shape and is provided at its open side with a convexo-concave lens 3, the latter being mounted in a suitable frame 4 which is hinged or otherwise secured to the shell 1. The standard 2 is provided at its lower end with suitable means for attaching it to a relatively immovable part of the automobile. This means is here shown as being in the form of a strip 5, the intermediate portion of which surrounds the standard, while its ends are secured to the automobile by securing elements 6.

Disposed within the hollow standard 2 and revolubly mounted therein is the shank portion 7 of a lamp supporting yoke 8, the two arms of which extend into the shell 1 and are provided at their upper ends with bearings 9. These bearings are provided with suitable wear compensating means here shown in the form of split sections having a bolt extending therethrough to draw the sections toward or away from each other. The shank portion 7 is provided with a shoulder 10 adjacent the lower end of the yoke 8, the purpose of which will be obvious.

The reference numeral 11 designates a reflector having trunnions 12 extending laterally from opposite sides thereof and disposed and revolubly mounted in the aforesaid bearings 9. Secured at the rear end of the reflector 11 in any suitable manner is an incandescent electric bulb 13, the lead wires 14 of which are connected to a connecting means 15 secured and extending through the rear wall of the shell 1.

Pivotally mounted upon the shell 1 and having one of its arms extending to the interior of the same, while its other arm extends to the exterior thereof, is a bell crank 16. The first mentioned arm of the bell crank 16 is connected by a link 17 to a bracket or stud 18 fixed to reflector 11. It is to be understood that the connections of the links 17 with the stud 18 and the bell crank 16 are loose and pivotal connections, here shown as being in the form of ordinary ball socket joints.

The arm of the bell crank 16 which extends to the exterior of the shell 1 is connected to one end of a wire or cable 19 which is disposed in a suitable tubing or casing 20 extending from a point adjacent the headlight to the dash board of the automobile. On the dash board of the automobile is mounted a knob 21 connected to the other end of the cable 19 whereby the latter may be pulled or pushed to operate the bell crank 16. A suitable means for holding the cable in locked position when adjusted to any desired point is provided.

Fixed to the lower end of the shank portion 7 of the yoke 8 above referred to is an arm 22, the free end of which is connected to one end of a rod 23, and the other end of the latter is connected to a similar portion of another headlight placed on the opposite side of the machine. This rod 23 is further connected by a link 24 to the rod $a$ which connects the steering knuckles of the automobile, so that when the machine is turned to the right or left, both headlights will be likewise turned to the right or left, the shells 1 and lenses 3 obviously remaining stationary while the lamps and reflectors shift.

If it is desired to shift the light from the lamp downwardly or vertically, the knob 21 is operated. This necessarily rocks the bell crank 16 and through the medium of the link 17 rocks the reflector 11, the latter turning upon its trunnions 12 mounted in the bearings in the arms of the supporting yoke.

From the foregoing description, taken in connection with the accompanying drawings, the construction, use and operation of the device will be readily understood. It may be seen that the objects of the invention have been effectively carried out, as an extremely simple, strong and durable dirigible headlight has been provided.

It is obvious that numerous changes in form, proportion and in the minor details of construction may be readily resorted to without departing from the spirit of this invention, and hence it is to be understood that the appended claim does not limit the invention to the precise construction herein shown and described.

I claim:—

A device of the class described comprising a hollow shell, an upright hollow supporting standard fixed to and depending from the lower side of said shell and provided with means for attachment to an immovable part of an automobile, a supporting yoke disposed within said shell and having a shank portion revolubly mounted in said standard, the lower end of said shank portion being provided with an arm adapted to be connected to the steering mechanism of the automobile, a lamp pivotally mounted upon the arms of said yoke to swing upon a horizontal axis, a bell crank pivoted to said shell at its lower side and having one of its arms projecting to the exterior of the same, and its other arm disposed within the shell, a link pivotally connected at one of its ends to the last mentioned arm of said bell crank and at its other end to said lamp for swinging the latter upon its horizontal axis, and an operating device connected to the other arm of the bell crank for actuating the same.

In testimony whereof I have hereunto set my hand in the presence of two subscribing witnesses.

WILLIAM E. KLEIN.

Witnesses:
JOHN C. KING,
HARRY RYERSON.